US007032182B2

(12) United States Patent
Prabhu et al.

(10) Patent No.: US 7,032,182 B2
(45) Date of Patent: Apr. 18, 2006

(54) GRAPHICAL USER INTERFACE ADAPTED TO ALLOW SCENE CONTENT ANNOTATION OF GROUPS OF PICTURES IN A PICTURE DATABASE TO PROMOTE EFFICIENT DATABASE BROWSING

(75) Inventors: Prasad V. Prabhu, Macedon, NY (US); Andrew J. Cowell, Orlando, FL (US)

(73) Assignee: Eastman Kodak Company, Rochester, NJ (US)

( * ) Notice: Subject to any disclaimer, the term of this patent is extended or adjusted under 35 U.S.C. 154(b) by 517 days.

(21) Appl. No.: 09/745,028

(22) Filed: Dec. 20, 2000

(65) Prior Publication Data

US 2002/0075310 A1 Jun. 20, 2002

(51) Int. Cl.
*G06F 3/00* (2006.01)

(52) U.S. Cl. ...................................... 715/805; 715/780

(58) Field of Classification Search ................ 345/767, 345/765, 764, 805, 802–803, 804, 744–747, 345/703, 704, 707, 715, 719–726, 838, 730–732, 345/780, 853–855, 712–713, 968, 823–824, 345/837; 707/10; 348/231.2
See application file for complete search history.

(56) References Cited

U.S. PATENT DOCUMENTS

| | | | | |
|---|---|---|---|---|
| 5,517,605 | A * | 5/1996 | Wolf | 707/104.1 |
| 5,832,298 | A * | 11/1998 | Sanchez et al. | 710/8 |
| 5,897,220 | A * | 4/1999 | Huang et al. | 396/2 |
| 5,898,434 | A * | 4/1999 | Small et al. | 345/810 |
| 5,915,258 | A * | 6/1999 | Toyokura | 715/505 |
| 6,107,961 | A * | 8/2000 | Takagi | 342/357.13 |
| 6,144,968 | A * | 11/2000 | Zellweger | 707/104.1 |
| 6,148,148 | A * | 11/2000 | Wain et al. | 396/2 |
| 6,154,601 | A * | 11/2000 | Yaegashi et al. | 386/52 |
| 6,229,904 | B1 * | 5/2001 | Huang et al. | 382/100 |
| 6,335,742 | B1 * | 1/2002 | Takemoto | 715/781 |
| 6,393,057 | B1 * | 5/2002 | Thoreau et al. | 375/240 |
| 6,417,841 | B1 * | 7/2002 | Doi et al. | 345/158 |
| 6,429,885 | B1 * | 8/2002 | Saib et al. | 345/854 |
| 6,480,665 | B1 * | 11/2002 | Hamada | 386/52 |
| 6,499,016 | B1 * | 12/2002 | Anderson | 704/275 |
| 6,519,415 | B1 * | 2/2003 | Kim et al. | 386/98 |
| 6,545,660 | B1 * | 4/2003 | Shen et al. | 345/767 |
| 6,590,608 | B1 * | 7/2003 | Matsumoto et al. | 348/231.2 |
| 6,675,197 | B1 * | 1/2004 | Satoh et al. | 709/204 |
| 6,721,001 | B1 * | 4/2004 | Berstis | 348/231.3 |
| 6,760,884 | B1 * | 7/2004 | Vertelney et al. | 715/500.1 |
| 6,862,038 | B1 * | 3/2005 | Anderson | 348/207.99 |
| 2001/0042206 | A1 * | 11/2001 | Carro et al. | 713/176 |
| 2001/0051035 | A1 * | 12/2001 | Brandsma | 386/68 |

* cited by examiner

*Primary Examiner*—Steven P. Sax
(74) *Attorney, Agent, or Firm*—David M. Woods

(57) ABSTRACT

A graphical user interface (GUI) allows a picture database user to enter metadata serving to annotate digital pictures to promote efficient picture database browsing. The annotation is permitted, not just for individual pictures, but for groups of pictures. The annotation information can be entered quickly, via a user-friendly interface (200, 204, 206), and can contain "social" information (via 116, 118 and 120) about groups of pictures (130–146), such as capture location, date and time, people or objects featured in groups of pictures, and events recorded by a group of pictures.

16 Claims, 2 Drawing Sheets

GRAPHICAL USER INTERFACE ADAPTED TO ALLOW SCENE CONTENT ANNOTATION OF GROUPS OF PICTURES IN A PICTURE DATABASE TO PROMOTE EFFICIENT DATABASE BROWSING

FIELD OF THE INVENTION

The present invention relates to graphical user interfaces in general, and to graphical user interfaces adapted for browsing and retrieving pictures in digital picture databases in particular.

BACKGROUND OF THE INVENTION

Digital images have become commonplace in interactive media such as web pages on the World Wide Web. In many systems the image is captured by a digital camera and stored as an image file, which an online user can later view. Digital images can also be captured by a digital camera and stored in a digital picture database using the memory mechanisms (e.g., hard drive, CD RW, diskette, etc.) of a personal computer (PC). Whether the user's computer operates in a stand-alone mode, or as a remote terminal, he/she can retrieve database pictures for viewing and printing by an attached printer.

The number of digital pictures, and hence the size of digital picture databases continues to grow, as the costs of digital cameras and memory continue to drop. It is becoming more common for a user to have stored in a digital picture database, many more pictures (even using "thumbnails" for initial viewing) than can be displayed on one or a few display screens. Finding particular pictures of interest in a large picture database can be challenging using methods typically available, for example, in the Windows® and Macintosh® operating systems. Users must typically open directories, and several folders and files, often painstakingly perusing each of a large number of digital images in an effort to find those of interest. Further, there is often no efficient way to retrieve groups of pictures not stored in the same files or folders, which the user may nonetheless, desire to retrieve and display in the same group.

To browse pictures in a picture database, some prior art techniques marginally improve upon the aforementioned brute force methods by allowing a user to introduce a single comment pertaining to each individual picture. A subsequent search of the picture database allows the user to not only view each picture, but also a particularized comment about each picture to help decide whether a picture is of interest. Even with this improvement, prior art picture database users must still painstakingly browse each picture to find those of interest. Even when prior art GUIs allow the user to store a comment for an individual picture, they are not often user-friendly, and the comments are often restricted to technical information (such as the file format, the compression technique used, and resolution).

What is therefore greatly needed, is a graphical user interface that allows users to easily and meaningfully augment picture database information in a manner which leads to an improvement in the picture database browsability.

SUMMARY OF THE INVENTION

To address the unmet needs of the prior art identified supra, the present invention provides a method of, via a graphical user interface (GUI), annotating picture information for pictures in a picture database. The method at least includes the steps of, generating a user-friendly display with picture indicia, in response to on-screen user input, identifying a plurality of pictures as belonging to a group, and accepting metadata input on-screen by the user, the metadata characterizing the group of pictures.

The present invention also provides a GUI adapted to annotate picture information for pictures in a picture database. The GUI at least includes a display generator adapted to generate a user-friendly display with picture indicia, a picture grouper adapted to, in response to on-screen user input, identify a plurality of pictures as belonging to a group, and a metadata receiver adapted to accept metadata input on-screen by the user, the metadata characterizing the group of pictures.

The addition of metadata in the manner allowed by the present invention makes picture databases amenable to powerful graphical browsers heretofore unavailable.

BRIEF DESCRIPTION OF THE DRAWINGS

Features and advantages of the present invention will become apparent to those skilled in the art from the description below, with reference to the following drawing figures, in which.

DETAILED DESCRIPTION OF THE INVENTION

Metadata is information about other information in a file or, information about data stored in a file. For purposes of digital picture databases, metadata can represent characterizations of the pictures, such as the place a picture was captured, the date and/or time of capture, and information about the scene content, among others.

The present invention provides a graphical user interface (GUI) that allows a user to subsequently enter metadata for logically arranged (by the user) groups of pictures, so that a graphical browser can be used to navigate the pictures, rather than having to follow prior art approaches requiring the user to open folders, files and the like, to browse pictures.

Figure 1:
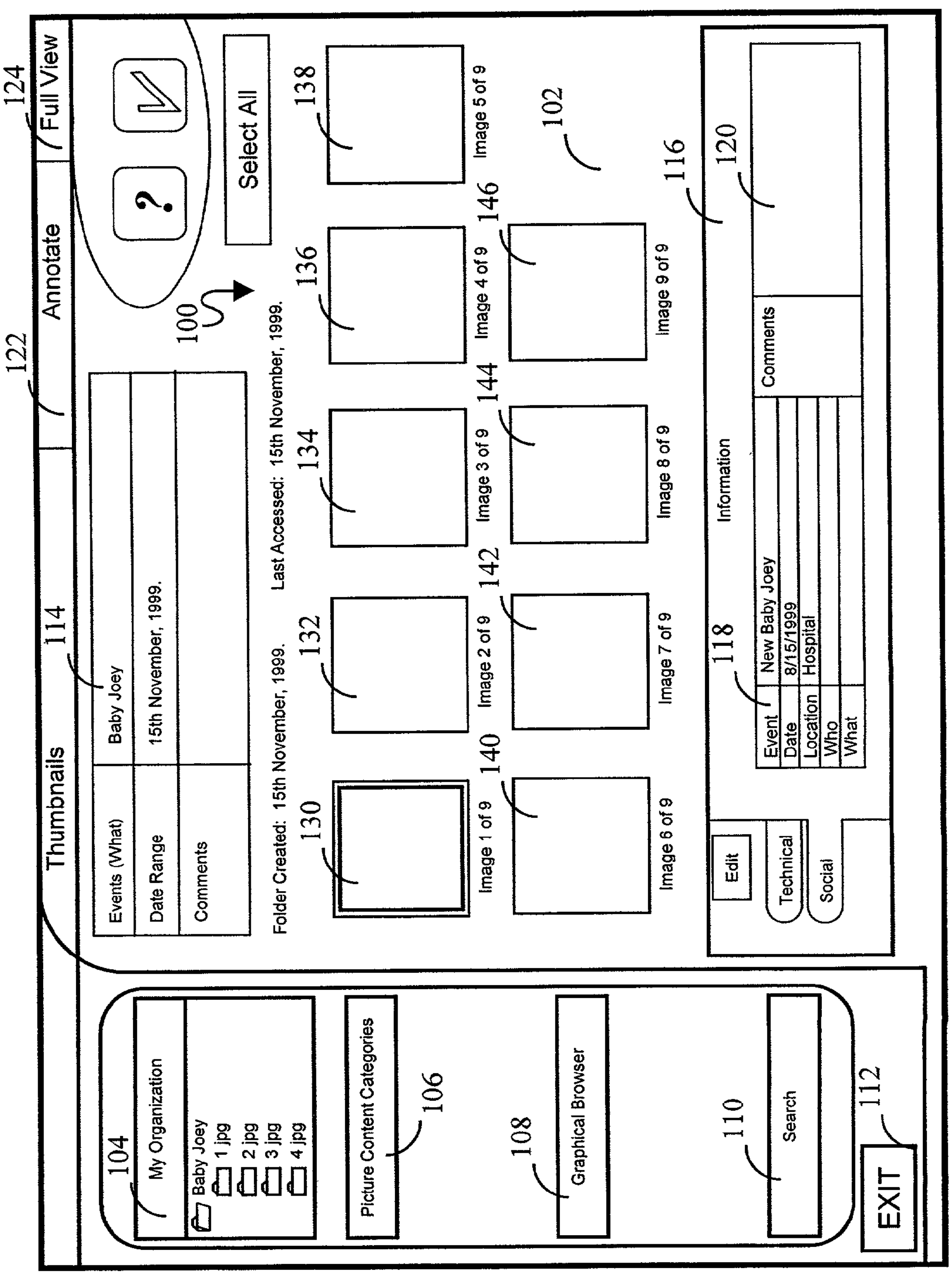
FIG. 1 is an illustration of a screen seen by a user, as part of the graphical user interface (GUI) of the present invention.

FIG. 1 shows a display 100 provided by the GUI of the present invention. The GUI provides the user with broad picture navigation capabilities, using several browsing approaches. The display 100 also allows the user to enter metadata in a manner consistent with the present invention, to aid picture browsing via graphical browsers, picture content categories, and comprehensive word searches, etc.

The display 100 contains a display area 102, along with four navigation method areas 104, 106, 108 and 110. The main display level 100 also includes other features, such as an "exit" button 112 to exit the main level display (and GUI) when desired, a thumbnail explanation area (or individual picture information area) 114 for displaying particular details about thumbnails or full pictures displayed in the display area 102, as well as an information box 116.

The information box 116 not only displays previously entered information, but allows the user to directly enter new information as desired, by placing the cursor over the area where information is to be entered, and typing the desired information. In an alternate embodiment, the entry of new information is preceded by a request for a security code or the like, to prevent unauthorized modifications of the picture database. The area 118 of the information box contains information about a group of pictures. In the example, the information in area 118 pertains to the 9 pictures displayed in the form of thumbnails. The area 120 of the information box contains any previously stored comments about the group of pictures. As was previously mentioned, the user can enter new information directly into the areas 118 and 120.

The group information can be either "social," or technical. Social information is information about the pictures that tends to be conveyed in everyday language, and which helps people to categorize the pictures. Social information includes, inter alia, the place, date and time of a picture's (or a group of pictures') capture, as well as events recorded by pictures, and people and things featured in the pictures. Technical information, on the other hand, refers to details about the pictures which are generally important to reproduction devices and methods. Technical information includes, inter alia, the pixel resolution, the file format, and the particular compression techniques used where the files have been compressed for efficient use of memory space.

The individual picture information area 114 displays any previously stored information about individual pictures highlighted. In the example, previously stored individual information for the first picture 130 in the group of pictures 130–146 is displayed. As with the information box 116, the individual picture information area 114 also allows a user to make changes or additions to the information particular to an individual picture.

When the user wishes to annotate pictures, or see annotations, he/she activates the "Annotate" button 122 near the upper right hand corner of the display. To provide a view (not shown) with only pictures (or thumbnails), and no annotations, the user activates the "Full View" button 124.

The information in the information boxes 114 and 116 are not only used to give a better description of the group of pictures, but may also be used by graphical browsers and other mechanisms for picture database navigation.

Figure 2:
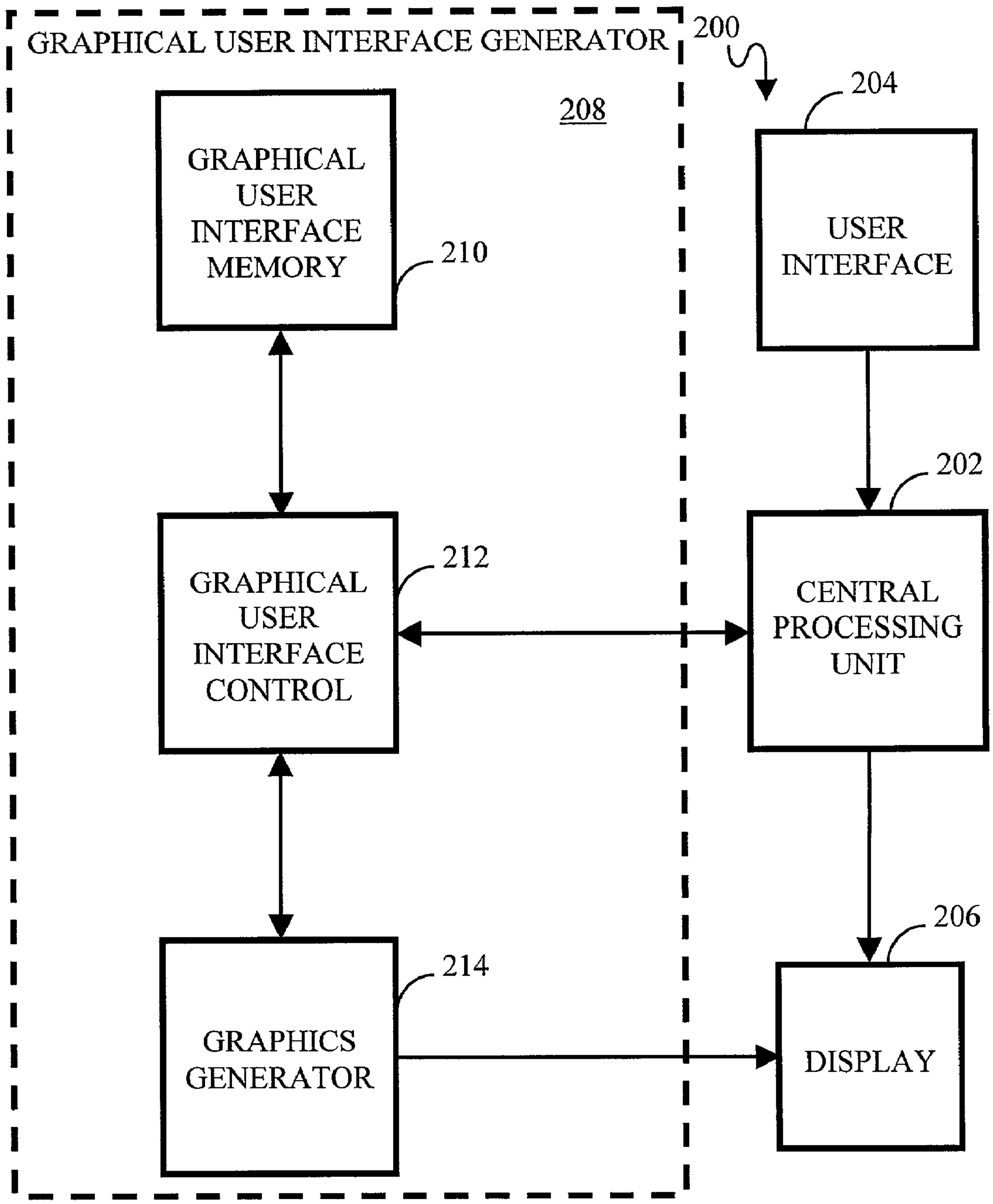
FIG. 2 is a general, schematic block diagram of a system capable of implementing the present-inventive GUI.

A general system 200 capable of implementing the present-inventive GUI nominally includes the components shown in FIG. 2. The various components of the system 200 need not have physical proximity. Indeed, the system 200 can be self-contained in a stand-alone computer system, part of a Local Area Network (LAN), or part of a remote processing system using Wide Area Networks (WANs) such as the Internet, to name a few variations.

The system 200 includes a CPU 202 as do computer systems in general, a user interface 204 which allows a user to input commands and image file metadata as described, supra, and a display 206 for viewing pictures, thumbnails, graphical browsers, and other visual stimuli.

A GUI generator 208 generates a graphical browser that allows the user to annotate pictures with metadata. The GUI generator 208 nominally includes a GUI memory 210 for storing the image files and the corresponding metadata, a GUI control 212, and a graphics generator 214.

Variations and modifications of the present invention are possible, given the above description. However, all variations and modifications which are obvious to those skilled in the art to which the present invention pertains are considered to be within the scope of the protection granted by this Letters Patent.

PARTS LIST

100 Graphical user interface (GUI) main display level
102 GUI main display area
104 Hierarchical picture grouping iconic region
106 Picture content iconic region
108 Graphical browser region
110 Word search region
112 GUI exit button
114 Individual picture information area
116 Information box/area
118 Group picture information area
120 Group picture comment area
122 Annotation view button
124 Full view button
130–146 Thumbnail representations of database pictures
200 Graphical User Interface (GUI) system
202 Central Processing Unit (CPU)
204 User interface
206 Display
208 GUI generator
210 GUI memory
212 GUI control
214 Graphics generator

What is claimed is:

1. A method of, via a graphical user interface (GUI), annotating picture information for pictures in a picture database, said method comprising the steps of:

generating a user-friendly display with picture indicia representing captured pictures;

in response to on-screen user input that identifies a plurality of the captured pictures as belonging to a group;

providing a single presentation of an information entry area for receiving information once about the group of pictures;

accepting customized metadata being input on-screen at one time by said user to the information entry area, said metadata characterizing said group of pictures; and automatically associating the accepted customized metadata with each of the pictures of the group.

2. The method in claim 1, wherein said metadata comprises social information.

3. The method in claim 2, wherein said social information comprises at least one event that said group of pictures records.

4. The method in claim 2, wherein said social information comprises temporal aspects of said group of pictures with respect to capture.

5. The method in claim 2, wherein said social information comprises capture location aspects of said group of pictures.

6. The method in claim 2, wherein said social information comprises people who are recorded in said group of pictures.

7. The method in claim 2, wherein said social information comprises objects that are recorded in said group of pictures.

8. The method in claim 2, wherein said social information comprises user-provided comments.

9. A graphical user interface (GUI) adapted to annotate picture information for pictures in a picture database, said GUI comprising:

a display generator adapted to generate a user-friendly display with picture indicia representing captured pictures;

a picture grouper adapted to define a group of pictures in response to on-screen user input identifying a plurality of pictures as belonging to the group;

a single information presentation of an entry area for receiving information once about the group of pictures;

a metadata receiver adapted to accept customized metadata being input on-screen at one time by said user to the single information entry area, said metadata characterizing said group of pictures; and a metadata association system adapted to automatically associate the accepted customized metadata with each of the pictures of the group.

10. The GUI in claim 9, wherein said metadata comprises social information.

11. The GUI in claim 10, wherein said social information comprises at least one event that said group of pictures records.

12. The GUI in claim 10, wherein said social information comprises temporal aspects of said group of pictures with respect to capture.

13. The GUI in claim 10, wherein said social information comprises capture location aspects of said group of pictures.

14. The GUI in claim 10, wherein said social information comprises people who are recorded in said group of pictures.

15. The GUI in claim 10, wherein said social information comprises objects that are recorded in said group of pictures.

16. The GUI in claim 10, wherein said social information comprises user-provided comments.

* * * * *